United States Patent
Decarreau et al.

(10) Patent No.: US 10,342,066 B2
(45) Date of Patent: Jul. 2, 2019

(54) METHOD AND APPARATUS FOR DUAL CONNECTIVITY MANAGEMENT

(71) Applicant: Nokia Solutions and Networks Oy, Espoo (FI)

(72) Inventors: Guillaume Decarreau, Munich (DE); Benoist Pierre Sebire, Tokyo (JP); Tsunehiko Chiba, Saitama (JP)

(73) Assignee: Nokia Solutions and Networks Oy, Espoo (FI)

( * ) Notice: Subject to any disclaimer, the term of this patent is extended or adjusted under 35 U.S.C. 154(b) by 149 days.

(21) Appl. No.: 15/524,310

(22) PCT Filed: Mar. 11, 2015

(86) PCT No.: PCT/EP2015/075524
§ 371 (c)(1),
(2) Date: May 4, 2017

(87) PCT Pub. No.: WO2016/071311
PCT Pub. Date: May 12, 2016

(65) Prior Publication Data
US 2018/0295670 A1    Oct. 11, 2018

Related U.S. Application Data

(60) Provisional application No. 62/076,681, filed on Nov. 7, 2014.

(51) Int. Cl.
*H04L 12/28* (2006.01)
*H04W 76/38* (2018.01)
(Continued)

(52) U.S. Cl.
CPC ............ *H04W 76/38* (2018.02); *H04W 76/15* (2018.02); *H04W 76/34* (2018.02); *H04W 84/20* (2013.01)

(58) Field of Classification Search
CPC .................................................... H04W 76/38
USPC ......................................... 370/252, 329, 386
See application file for complete search history.

(56) References Cited

U.S. PATENT DOCUMENTS

| | | | |
|---|---|---|---|
| 2003/0100310 A1 | 5/2003 | Lindner et al. | 455/452 |
| 2012/0207070 A1 | 8/2012 | Xu et al. | 370/311 |

(Continued)

OTHER PUBLICATIONS

3GPP TS 36.300 V.12.3.0, "3rd Generation Partnership Project; Technical Specification Group Radio Access Network: Evolved Universal terrestrial Radio Access (E-UTRA) and Evolved Universal Terrestrial Radio Access Network (E-UTRAN); Overall description; Stage 2 (Release 12)", Sep. 2014, 215 pages.

(Continued)

*Primary Examiner* — John Pezzlo
(74) *Attorney, Agent, or Firm* — Harrington & Smith

(57) ABSTRACT

Methods and apparatus management of dual connectivity in wireless communications. A master base station belonging to a wireless communication network including the master base station and a secondary cell group including at least one secondary base station, configures one or more secondary cell group bearers for a secondary base station. Configuring the secondary cell group bearer includes configuring an inactivity timer for the secondary cell group. The inactivity timer is configured to indicate that, if no activity has occurred on the secondary cell group bearer during pendency of the inactivity timer, the secondary cell group bearer is to be released. The master base station then signals the configuration to the secondary base station.

20 Claims, 8 Drawing Sheets

(51) Int. Cl.
  *H04W 76/15* (2018.01)
  *H04J 1/16* (2006.01)
  *H04W 76/34* (2018.01)
  *H04W 84/20* (2009.01)

(56) References Cited

U.S. PATENT DOCUMENTS

| 2014/0019743 | A1 | 1/2014 | DeLuca | 713/100 |
| 2015/0263846 | A1* | 9/2015 | Lee | H04L 5/26 370/280 |
| 2016/0219475 | A1* | 7/2016 | Kim | H04L 5/00 |
| 2017/0127473 | A1* | 5/2017 | Virtej | H04W 76/38 |

OTHER PUBLICATIONS

3GPP TS 36.331 V.12.3.0, "3rd Generation Partnership Project; Technical Specification Group Radio Access Network: Evolved Universal terrestrial Radio Access (E-UTRA); Radio Resource Control (RRC); Protocol specification (Release 12)", Sep. 2014, 378 pages.

3GPP TS 36.423 V12.3.0, "3rd Generation Partnership Project; Technical Specification Group Radio Access Network; Evolved Universal Terrestrial Radio Access Network (E-UTRAN); x2 application protocol (X2AP) (Release 12)", Sep. 2014, 153 pages.

R2-144106, 3GPP TSG-RAN WG2 Meeting #87bis, "Cross Reporting for Dual Connectivity", Nokia Networks, et al., Oct. 2014, 2 pages.

R2-144578, 3GPP TSG-RAN WG2 Meeting #87bis, "Introduction of Dual Connectivity", NTT Docomo, Inc., Oct. 2014, 66 pages.

RP-122033, 3GPP TSG-RAN Meeting #58, New Study Item Description: Small Cell enhancements for E-UTRA and E-UTRAN—Higher-layer aspects, Dec. 2012, 5 pages.

RP-132069, 3GPP TSG-RAN Meeting #62, "New Work Item Description: Dual Connectivity for LTE—Core Part", NTT Docomo, Inc., et al., Dec. 2013, 18 pages.

* cited by examiner

METHOD AND APPARATUS FOR DUAL CONNECTIVITY MANAGEMENT

CROSS REFERENCE TO RELATED APPLICATIONS

This application claims priority from U.S. Provisional Application Ser. No. 62,076,681, filed Nov. 7, 2014, and incorporated herein by reference in its entirety.

FIELD OF THE INVENTION

The present invention relates generally to wireless communication. More particularly, the invention relates to improved systems and techniques for management of dual connectivity in wireless communication.

BACKGROUND

The following definitions of abbreviations will be useful in understanding the description presented herein:
DC Dual Connectivity
DL Down Link
DRB Data Radio Bearer
eNB E-UTRAN Node B
E-UTRAN Evolved UTRAN
HFN Hyper Frame Number
MeNB Master eNB
MAC Medium Access Control
RRC Radio Resource Control
SCG Secondary Cell Group
SeNB Secondary eNB
SN Sequence number
UE User Equipment
UL Uplink
UTRAN Universal Terrestrial Radio Access Network One important development in efficient use of frequencies is dual connectivity. A wireless network can comprise large cells, also referred to as macro cells, defined as the service area of larger, higher-powered base stations. In 3GPP, 3GPP LTE, and 3GPP LTE-A networks and present and anticipated extensions and enhancements of such networks, base stations are referred to as enhanced Node Bs, (eNodeBs or eNBs) and the user devices served by the eNBs are referred to as user equipments or UEs.

In addition to large cells, a network may also comprise small cells operating within each of one or more large cells with a small cell being defined as the service area of a smaller, lower-powered eNBs. The large eNBs may be referred to as master eNBs or MeNBs, and the small eNBs may be referred to as secondary eNBs or SeNBs, with the SeNBs belonging to a secondary cell group (SCG). The frequencies used by SeNBs may be re-used within a large cell, because the small base stations have shorter ranges than do the larger base stations. Such dual connectivity using MeNBs and SeNBs comprises two different alternative architectures as defined by current 3GPP standards—architecture 1A and architecture 3C. In architecture 1A, a data radio bearer (DRB) is connected to the core network directly from the SeNB, and is called a secondary cell group (SCG) bearer. A bearer that is configured only via the MeNB is called a master cell group (MCG) bearer.

When there is no activity on a DRB, maintaining the bearer is an inefficient use of frequencies and of UE power, and if only one DRB is configured for a UE, maintaining the radio resource control connection for this DRB with no activity is also inefficient. Thus, an eNB usually releases its DRB when there is no traffic. In conventional approaches, this is accomplished with an implementation specific timer—if there is no data on the uplink or downlink for a specified time, the DRB, along with the RRC connection if there is only one DRB, is released.

SUMMARY

In one embodiment of the invention, an apparatus comprises at least one processor and memory storing a program of instructions. The memory storing the program of instructions is configured to, with the at least one processor, cause the apparatus to at least, at a master base station belonging to a wireless communication network comprising the master base station and a secondary cell group comprising at least one secondary base station, configure one or more secondary cell group bearers for a secondary base station, wherein configuring the secondary cell group bearer comprises configuring an inactivity timer for the secondary cell group, and wherein the inactivity timer is configured to indicate that, if no activity has occurred on the secondary cell group bearer during pendency of the inactivity timer, the secondary cell group bearer is to be released; and signal the configuration to the secondary base station.

In another embodiment of the invention, an apparatus comprises at least one processor and memory storing a program of instructions. The memory storing the program of instructions is configured to, with the at least one processor, cause the apparatus to at least, at a secondary base station belonging to a wireless communication network comprising a master base station and a secondary cell group comprising at least the secondary base station, in response to receiving an secondary cell group bearer configuration from a master base station, with the configuration including an inactivity timer, establish the SCG bearer and monitor the inactivity timer; in response to expiration of the timer, determine whether traffic has been present during pendency of the inactivity timer; and in response to recognition that no traffic has been if there is no traffic on the secondary cell group bearer during pendency of the timer, release the secondary cell group bearer.

In another embodiment of the invention, a method comprises, at a master base station belonging to a wireless communication network comprising the master base station and a secondary cell group comprising at least one secondary base station, configure one or more secondary cell group bearers for a secondary base station, wherein configuring the secondary cell group bearer comprises configuring an inactivity timer for the secondary cell group, and wherein the inactivity timer is configured to indicate that, if no activity has occurred on the secondary cell group bearer during pendency of the inactivity timer, the secondary cell group bearer is to be released; and signal the configuration to the secondary base station.

In another embodiment of the invention, a method comprises, at a secondary base station belonging to a wireless communication network comprising a master base station and a secondary cell group comprising at least the secondary base station, in response to receiving an secondary cell group bearer configuration from a master base station, with the configuration including an inactivity timer, establish the SCG bearer and monitor the inactivity timer; in response to expiration of the timer, determine whether traffic has been present during pendency of the inactivity timer; and in response to recognition that no traffic has been if there is no traffic on the secondary cell group bearer during pendency of the timer, release the secondary cell group bearer.

In another embodiment of the invention, a computer readable medium stores a program of instructions. Execution of the program of instructions by at least one processor configures an apparatus to at least, at a master base station belonging to a wireless communication network comprising the master base station and a secondary cell group comprising at least one secondary base station, configure one or more secondary cell group bearers for a secondary base station, wherein configuring the secondary cell group bearer comprises configuring an inactivity timer for the secondary cell group, and wherein the inactivity timer is configured to indicate that, if no activity has occurred on the secondary cell group bearer during pendency of the inactivity timer, the secondary cell group bearer is to be released; and signal the configuration to the secondary base station.

In another embodiment of the invention, a computer readable medium stores a program of instructions. Execution of the program of instructions by at least one processor configures an apparatus to at least, at a secondary base station belonging to a wireless communication network comprising a master base station and a secondary cell group comprising at least the secondary base station, in response to receiving an secondary cell group bearer configuration from a master base station, with the configuration including an inactivity timer, establish the SCG bearer and monitor the inactivity timer; in response to expiration of the timer, determine whether traffic has been present during pendency of the inactivity timer; and in response to recognition that no traffic has been if there is no traffic on the secondary cell group bearer during pendency of the timer, release the secondary cell group bearer.

DETAILED DESCRIPTION

The present description is presented in terms of third generation partnership project (3GPP) long term evolution (LTE) and 3GPP LTE-advanced (3GPP LTE-A) systems, but it will be recognized that the systems and techniques described herein may be used in any suitable environment.

Figure 1:
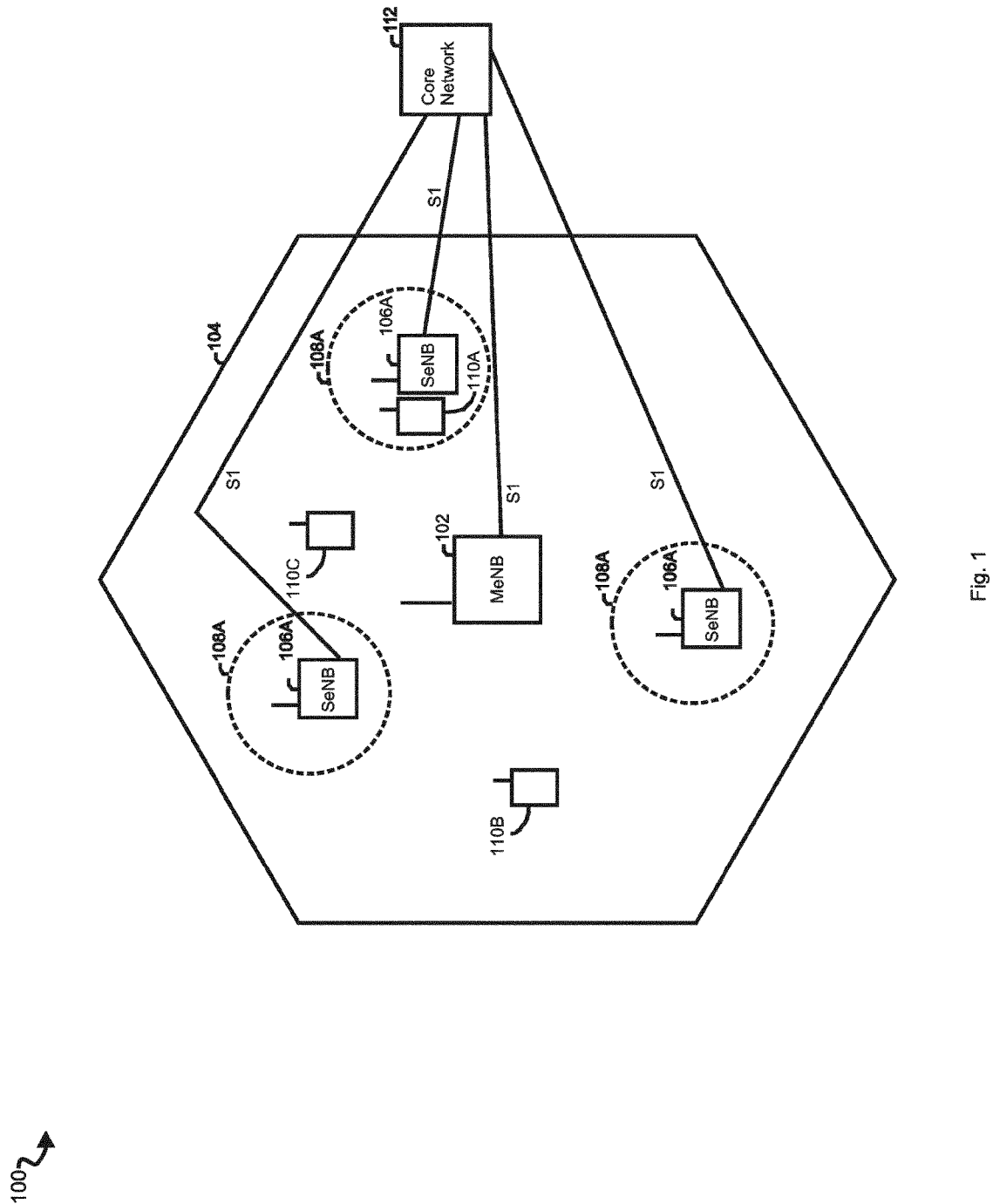
FIG. 1 illustrates a network according to an embodiment of the present invention.

FIG. 1 illustrates a network 100 according to an embodiment of the present invention. The network 100 is operating in architecture 1A and comprises a MeNB 102 defining a master cell 104, and SeNBs 106A-106C, defining secondary cells 108A-108C, respectively. The network 100 serves UEs 110A-110E, and in the present example, the UE 110A is operating in a dual connection with the MeNB 102 and the SeNB 106A. The MeNB 102 and the SeNBs 106A-106C are connected, suitably through 51 connections, to a core network 112.

Figure 2:
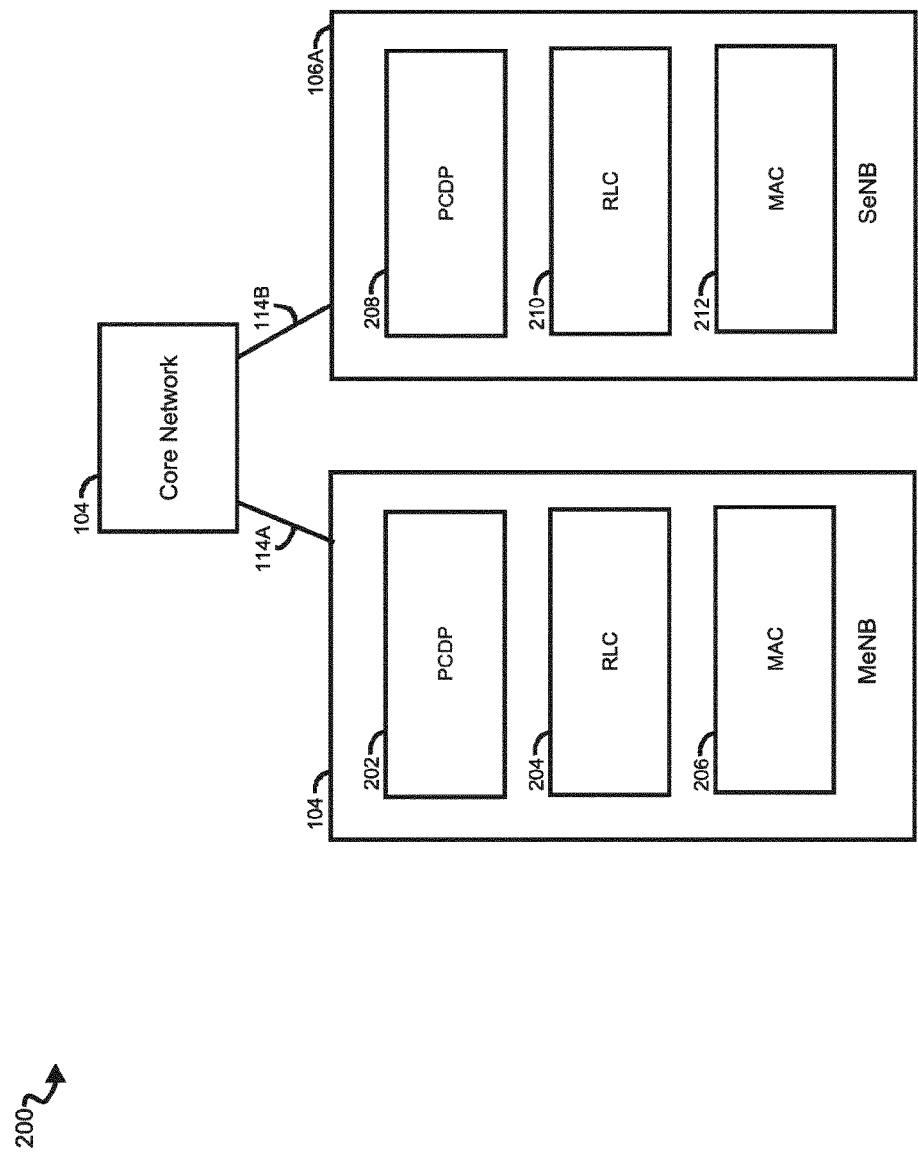
FIG. 2 illustrates a block diagram of a master eNB and a secondary eNB according to an embodiment of the present invention.

FIG. 2 presents an illustration 200 of the architecture 1A used in the dual connection between the UE 110A and the MeNB 102 and SeNB 106A. The MeNB 102 implements a packet data convergence protocol (PDCP) layer 202, radio link control (RLC) layer 204, and media access control (MAC) layer 206, and the SeNB 106A implements a packet data convergence protocol (PDCP) layer 208, radio link control (RLC) layer 210, and media access control (MAC) layer 212. The MeNB 102 and SeNB 106A are connected to the core network 112 by the S1 connections 114 and 116, respectively.

In the architecture 1A configuration described above, the MeNB is not aware of the user plane traffic going through the SeNB and so is unable to detect whether an SCG bearer is active or not. Because the MeNB controls the RRC for the UE, only the MeNB is able to trigger a DRB release within the UE, or an RRC connection release. The SeNB (in this case, 106A) can ask to transfer an SCG bearer to the MeNB 102, but under current specifications it is not possible for the MeNB to know whether this transfer is due to inactivity. Therefore, there is a significant likelihood that the MeNB will simply reconfigure the SCG bearer to an MCG bearer rather than releasing it. This maintains an unnecessary connection until the MeNB recognizes that the bearer is inactive.

Accordingly, according to one or more embodiments of the present invention, mechanisms are provided to allow the SeNB to release an SCG bearer if there is no traffic, based on a timer provided to the SeNB by the MeNB. For each SCG bearer, the MeNB can signal a timer to the SeNB during the configuration of the bearer.

When the SeNB releases the bearer due to inactivity, the reason for this release may be provided to the MeNB so that the MeNB can determine whether to release the bearer and possibly the RRC connection. In addition, the MeNB can take the reason for release (inactivity) into account in setting a new timer for that bearer in the next DRB addition. This use of the reason for release in setting the timer improves efficiency in optimization of radio resources.

FIGS. 3-6 present diagrams 300, 400, 500, 600, showing elements of an exemplary network and a UE served by the network, with interaction between, and actions performed by, the various elements.

Figure 3:
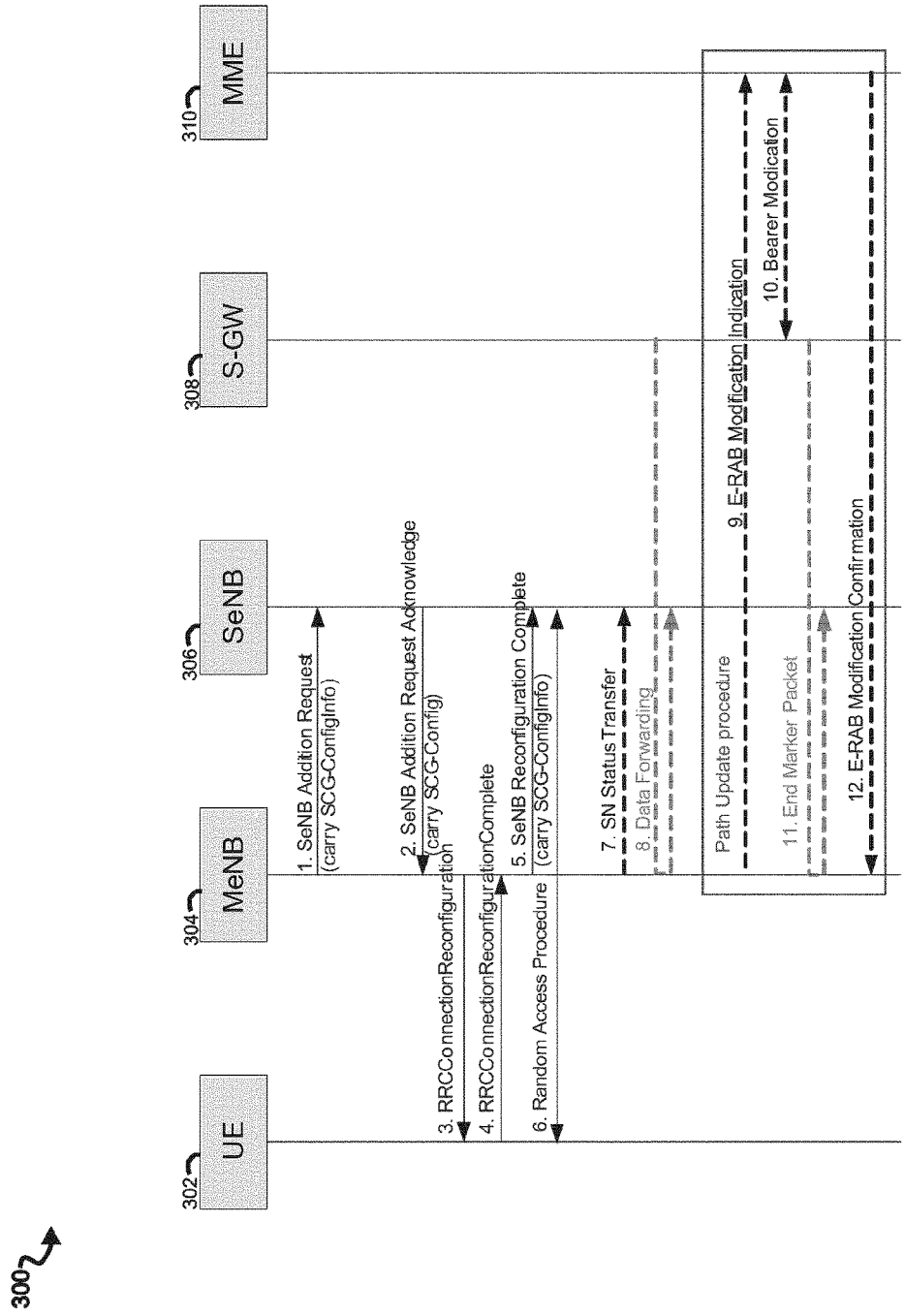
FIGS. 3-6 illustrate signal flows and operations according to embodiments of the present invention.

FIG. 3 presents an SeNB addition procedure 300 according to an embodiment of the present invention, showing interactions between, and actions performed by, a UE 302, MeNB 304, SeNB 306, serving gateway (S-GW) 308, and mobility management entity (MME) 310 (the SG-W and MME being elements of the core network). The MeNB 304 sends an SeNB Addition Request to the SeNB 306, carrying an SCG-ConfigInfo field, with the SCG-ConfigInfo field providing configuration instructions, including signaling of a timer for each added SCG bearer. The SeNB 306 responds with an SeNB Addition Request Acknowledge message, carrying an SCG-Config field, with the SCG-Config field indicating the configuration. The MeNB 304 sends an RRC-ConnectionReconfiguration message to the UE 302 and the UE 302 responds with an RRCConnectionReconfiguration-Complete message to the MeNB 304. The MeNB 304 sends an SeNB Reconfiguration Complete message to the SeNB 306. A random access procedure, including a carry SCG-ConfigInfo field, is then carried out between the UE and the SeNB.

The MeNB 304 then sends a sequence number (SN) Status Transfer message to the SeNB 306 and the MeNB 304 performs Data Forwarding to SeNB 306. The network then performs a path update procedure, with the MeNB 304 sending an E-RAB Modification Indication message to the MME 310, the MME 310 sends a Bearer Modification message to the S-GW 308, the S-GW 308 sends an End Marker Packet to the MeNB 304 and SeNB 306, and the MME 310 sends an E-RAB Modification Confirmation to the MeNB.

Figure 4:
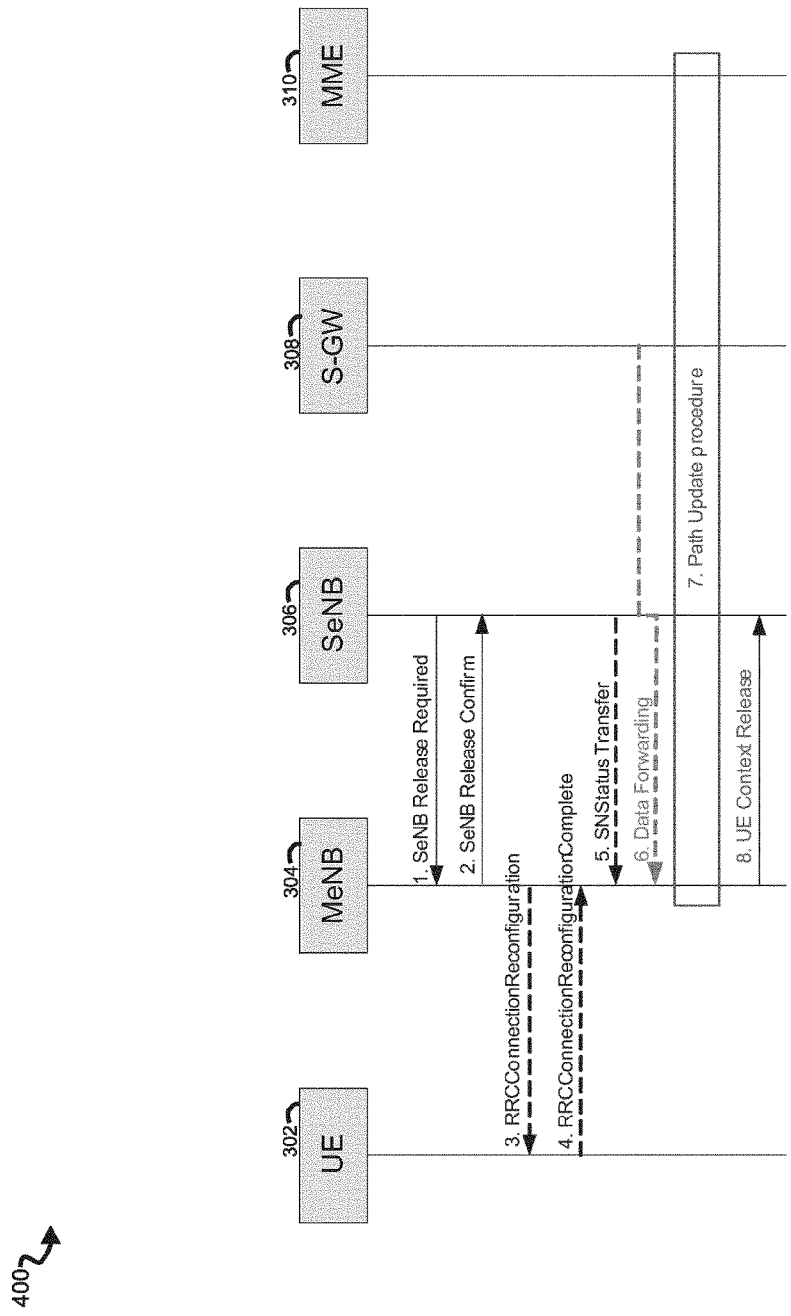

FIG. 4 illustrates an SeNB release procedure 400 according to an embodiment of the present invention. The SeNB 306 sends an SeNB Release Required message to the MeNB 304. For each SCG bearer, the SeNB Release Required message can include an indication as to whether or not the SCG bearer was released due to inactivity. The MeNB 304 responds with an SeNB Release Confirm message. The MeNB 304 sends an RRCConnectionReconfiguration message to the UE 302 and the UE 302 responds with an RRCConnectionReconfigurationComplete message to the MeNB 304. The MeNB 304 sends an SN Status Transfer message to the SeNB 306 and the SeNB 306 performs Data Forwarding to the MeNB 304. The network then performs a path update procedure, with the MeNB 304 sending a UE Context Release message to the SeNB 306.

Figure 5:
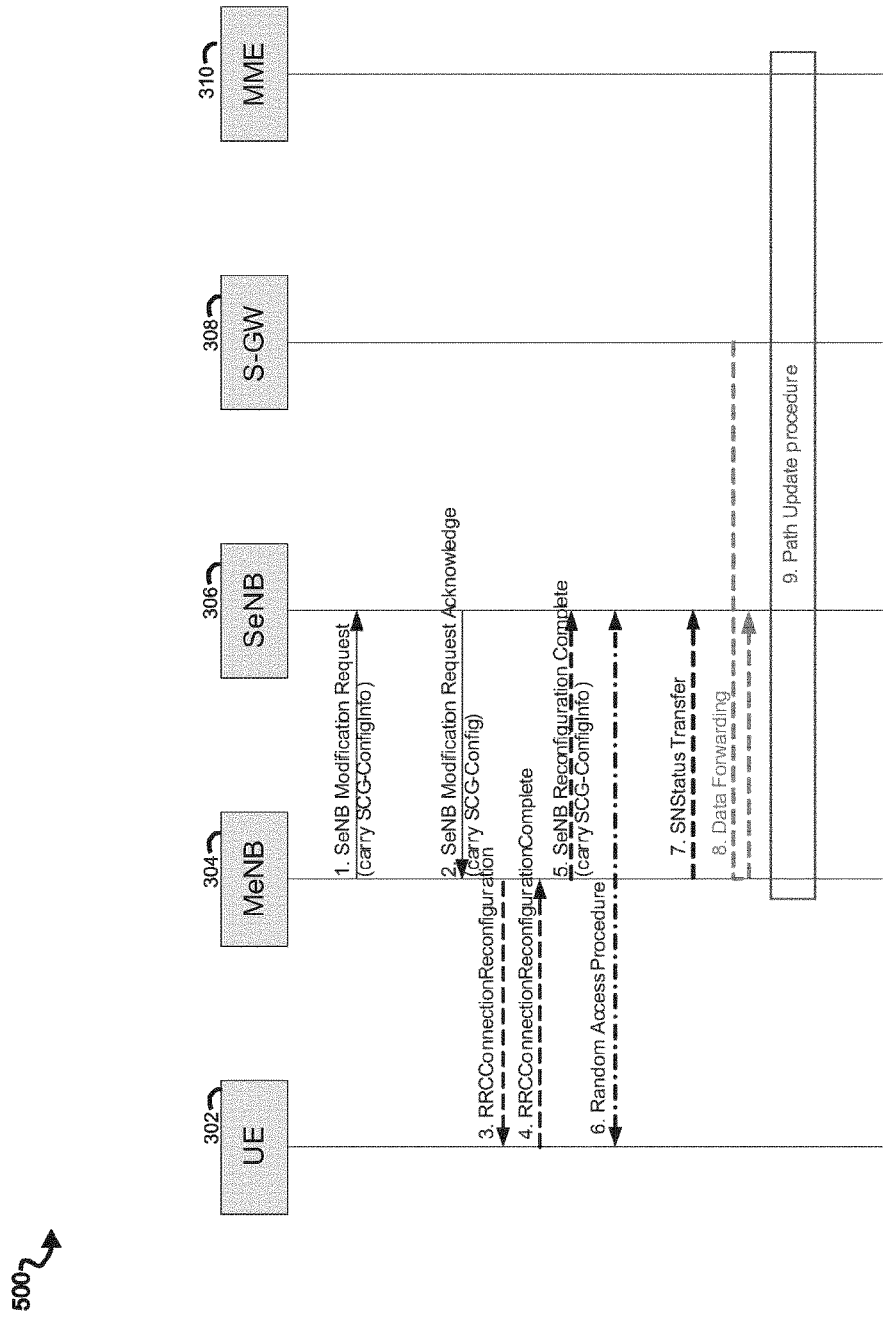

FIG. 5 presents an SeNB reconfiguration procedure 500 according to an embodiment of the present invention, showing actions performed when the reconfiguration involves addition of an SCG bearer. The reconfiguration is initiated by the MeNB 304. The MeNB 304 sends an SeNB Modification Request to the SeNB 306, carrying an SCG-ConfigInfo field, with the SCG-ConfigInfo field providing configuration instructions. The configuration instructions specify each SCG bearer to be added and include a timer for each added SCG bearer. In addition, the configuration instructions may modify the timer for the current SCG bearer. The SeNB 306 responds with an SeNB Addition Request Acknowledge message, carrying an SCG-Config field, with the SCG-Config field indicating the configuration. The MeNB 304 sends an RRCConnectionReconfiguration message to the UE 302 and the UE 302 responds with an RRCConnectionReconfigurationComplete message to the MeNB 304. The MeNB 304 sends an SN Status Transfer message to the SeNB 306 and the MeNB 304 performs Data Forwarding to the SeNB 306. The network then performs a path update procedure.

Figure 6:
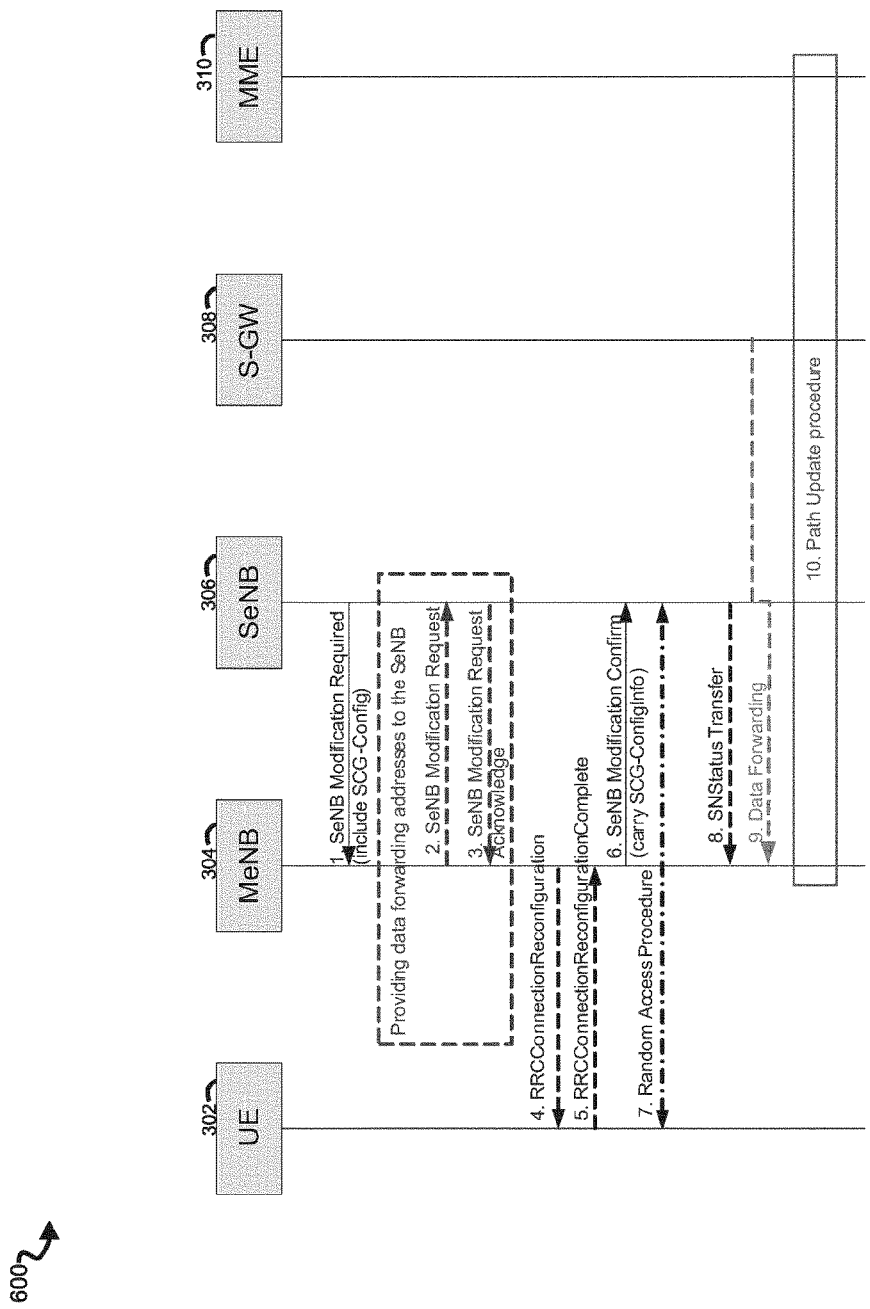

FIG. 6 illustrates an SeNB reconfiguration procedure 600 according to an embodiment of the present invention, showing actions performed when the reconfiguration involves release of an SCG bearer. This reconfiguration is initiated by the SeNB 306. The SeNB 306 sends an SeNB modification Required message to the MeNB 304. For each SCG bearer, the SeNB Modification Required message can include an indication as to whether or not the SCG bearer was released due to inactivity. It can also include an indication of bearers for which there is no activity—that is, for which the inactivity timer has expired. The MeNB 304 responds with an SeNB Release Confirm message. The MeNB 304 sends an RRCConnectionReconfiguration message to the UE 302 and the UE 302 responds with an RRCConnectionReconfigurationComplete message to the MeNB 304. The MeNB 304 sends an RRCConnectionReconfiguration message to the UE 302 and the UE 302 responds with an RRCConnectionReconfigurationComplete message to the MeNB 304. The MeNB 304 sends an SeNB Modification Confirm message to the SeNB 306, carrying an SCG-ConfigInfo field. A random access procedure, including a carry SCG-ConfigInfo field, is then carried out between the UE 302 and the SeNB 306.

The MeNB 304 sends an SN Status Transfer message to the SeNB 306 and the SeNB 306 performs Data Forwarding to the MeNB 304. The network then performs a path update procedure.

Figure 7:
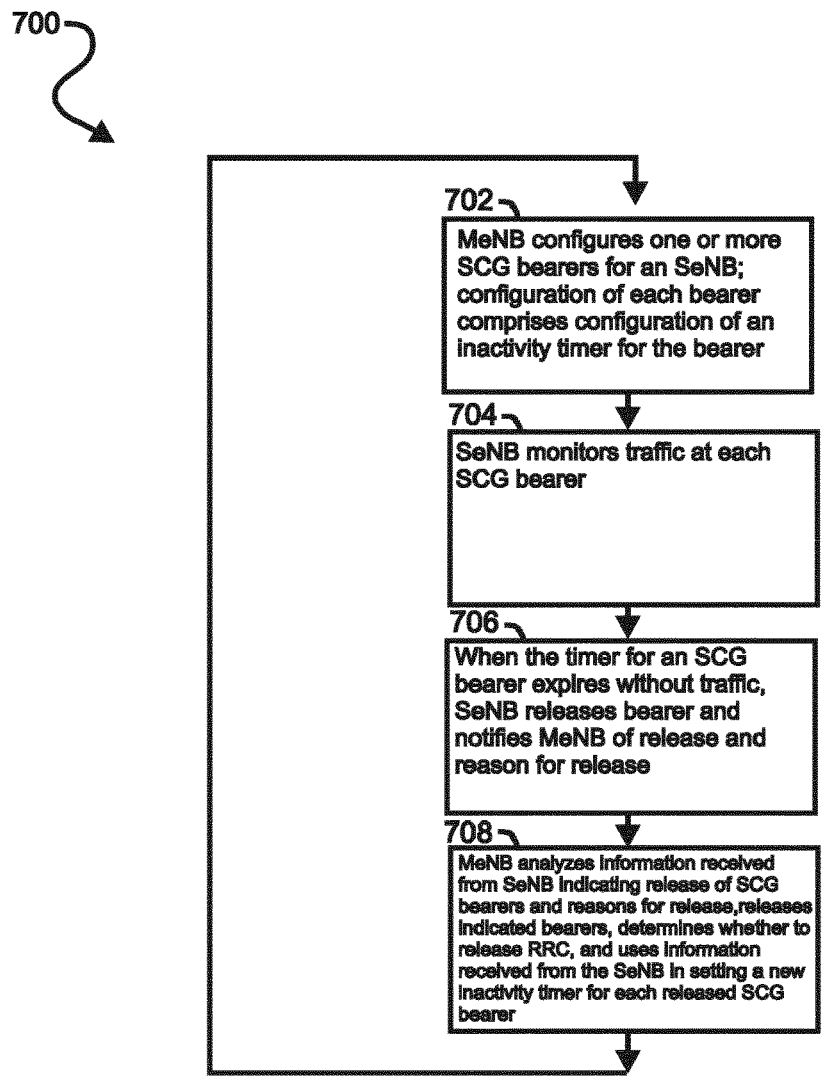
FIG. 7 illustrates a process according to an embodiment of the present invention.

FIG. 7 illustrates a process 700 according to an embodiment of the present invention. At block 702, an MeNB configures one or more SCG bearers for an SeNB. Configuration of each bearer comprises configuration of an inactivity timer for the SCG bearer. At block 704, the SeNB monitors traffic at each SCG bearer. At block 706, when the timer for an SCG bearer expires without traffic, the SeNB releases the bearer and notifies the MeNB of the release, as well as the reason for the release. At block 708, the MeNB analyzes information received from the SeNB indicating release of SCG bearers and reasons for the releases of the bearers, releases the bearers, determines whether to release the RRC, and uses reason information to set inactivity timers to be used when establishing SCG bearers for the SeNB. The process then returns to block 702 for establishment of new bearers, using the inactivity timers established based on the information received from the SeNB relating to release of SCG timers.

Figure 8:
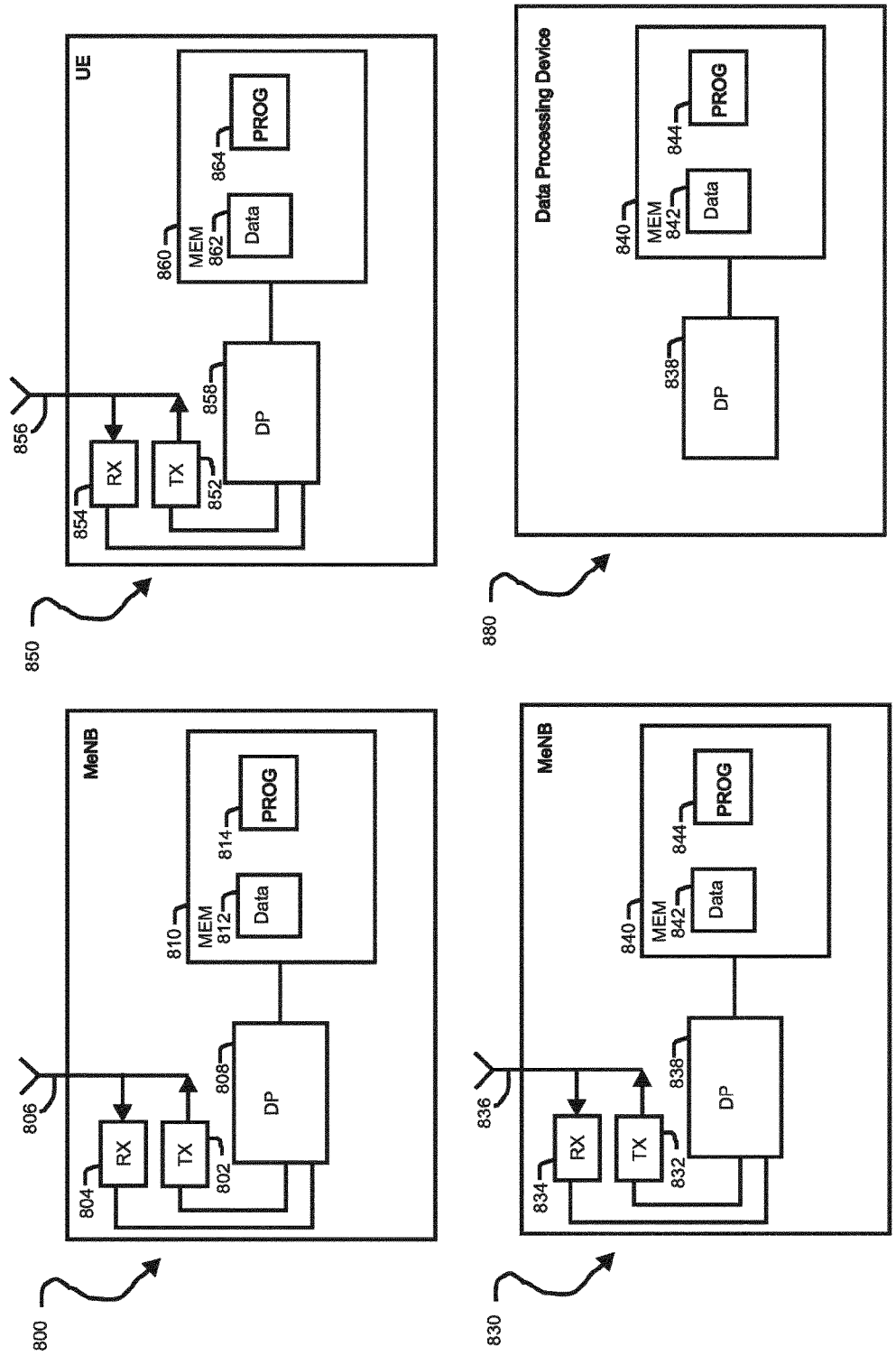
FIG. 8 illustrates elements that can be used to carry out embodiments of the present invention.

FIG. 8 illustrates details of an MeNB 800, an SeNB 830, a user equipment (UE) 850, and a data processing unit 870, suitable for use as one or more of the elements of a core network. The MeNB 300 may suitably comprise a transmitter 802, receiver 804, and antenna 806. The eNB 800 may also include a processor (DP) 808 and memory (MEM) 810. The eNB 800 may employ data 812 and programs (PROGS) 814, residing in memory 810.

The SeNB 830 may suitably comprise a transmitter 832, receiver 834, and antenna 836. The SeNB 830 may also include a processor (DP) 838 and memory (MEM) 840. The eNB 830 may employ data 842 and programs (PROGS) 844, residing in memory 840.

The UE 850 may suitably comprise a transmitter 852, receiver 854, and antenna 856. The UE 850 may also include a processor (DP) 858 and memory (MEM) 860. The UE 850 may employ data 862 and programs (PROGS) 864, residing in memory 860.

The data processing element 870 may suitably comprise a processor (DP) 878 and memory (MEM) 880, and may employ data 882 and programs (PROGS) 884.

At least one of the PROGs 814 in the MeNB 800 is assumed to include a set of program instructions that, when executed by the associated DP 808, enable the device to operate in accordance with the exemplary embodiments of this invention, as detailed above. In these regards the exemplary embodiments of this invention may be implemented at least in part by computer software stored on the MEM 810, which is executable by the DP 808 of the MeNB 800, or by hardware, or by a combination of tangibly stored software and hardware (and tangibly stored firmware). Similarly, at least one of the PROGs 834 in the SeNB 830 is assumed to include a set of program instructions that, when executed by the associated DP 838, enable the device to operate in accordance with the exemplary embodiments of this invention, as detailed above. In these regards the exemplary embodiments of this invention may be implemented at least in part by computer software stored on the MEM 840, which is executable by the DP 838 of the SeNB 830, or by hardware, or by a combination of tangibly stored software and hardware (and tangibly stored firmware).

Similarly, at least one of the PROGs 864 in the UE 850 is assumed to include a set of program instructions that, when executed by the associated DP 858, enable the device to operate in accordance with the exemplary embodiments of this invention, as detailed above. In these regards the exemplary embodiments of this invention may be implemented at least in part by computer software stored on the MEM 360, which is executable by the DP 858 of the UE 850, or by hardware, or by a combination of tangibly stored software and hardware (and tangibly stored firmware). Finally, at least one of the PROGs 884 in the data processing device 880 is assumed to include a set of program instructions that, when executed by the associated DP 888, enable the device to operate in accordance with the exemplary embodiments of this invention, as detailed above. In these regards the exemplary embodiments of this invention may be implemented at least in part by computer software stored on the MEM 880, which is executable by the DP 888 of the data processing device 870, or by hardware, or by a combination of tangibly stored software and hardware (and tangibly stored firmware).

Electronic devices implementing these aspects of the invention need not be the entire devices as depicted at FIG. 1, FIG. 2, or FIG. 8 or may be one or more components of the same such as the above described tangibly stored software, hardware, firmware and DP, or a system on a chip SOC or an application specific integrated circuit ASIC.

In general, the various embodiments of the UE 850 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 810, 840, 860, and 880 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 808, 838, 858 and 888 include but are not limited to general purpose computers, special purpose computers, microprocessors, digital signal processors (DSPs) and multi-core processors.

In one embodiment of the invention, a method comprises, at an MeNB, configuring one or more SCG bearers at an SeNB and signaling the configuration to the SeNB, wherein the configuration of an SCG bearer comprises configuring an inactivity timer for the SCG.

In another embodiment of the invention, signaling of the configuration of an SCG bearer to the SeNB comprises signaling the inactivity timer, and wherein, expiration of the inactivity timer for an SCG bearer with no traffic on the SCG bearer with on traffic on the SCG bearer during pendency of the inactivity timer indicates that the SCG bearer can be released.

In another embodiment of the invention, in response to recognition by the MeNB that an SCG timer was released because of expiration of the inactivity timer, the MeNB examines whether to release the radio resource control connection.

In another embodiment of the invention, the method comprises, in response to recognition by the MeNB that an SCG timer was released because of expiration of the inactivity timer, taking the reason for the release of the SCG bearer into account in configuring an inactivity timer for the bearer in a subsequent SCG bearer configuration.

In another embodiment of the invention, an SeNB, in response to receiving an SCG bearer configuration from an MeNB, with the configuration including an inactivity timer, establishes the SCG bearer and monitors the timer and, if there is no traffic on the SCG bearer during pendency of the timer, releases the SCG bearer.

In another embodiment of the invention, releasing of the SCG bearer by the SeNB comprises sending a bearer release message to the MeNB.

In another embodiment of the invention, the bearer release message sent to the MeNB by the SeNB includes an indication of the reason for the release.

In another embodiment of the invention, if expiration of the inactivity timer was the reason for release of the SCG bearer, the bearer release message sent to the MeNB by the SeNB indicates that the bearer was released due to inactivity.

In another embodiment of the invention, expiration of the inactivity timer triggers a message from SeNB to MeNB to notify the expiration of the timer for a given bearer.

In another embodiment of the invention, in response to recognition by the MeNB that the inactivity expired for a bearer, the MeNB examines whether to release the radio resource control connection.

In another embodiment of the invention, an apparatus comprises a processor and memory storing a program of instructions. Execution of the program of instructions by the processor causes the apparatus to at least control an MeNB to configure one or more SCG bearers at an SeNB and signal the configuration to the SeNB, wherein the configuration of an SCG bearer comprises configuring an inactivity timer for the SCG.

In another embodiment of the invention, signaling of the configuration of an SCG bearer to the SeNB comprises signaling the inactivity timer, and wherein expiration of the inactivity timer for an SCG bearer with no traffic on the SCG bearer with no traffic on the SCG bearer during pendency of the inactivity timer indicates that the SCG bearer can be released.

In another embodiment of the invention, the apparatus is further caused to, in response to recognition by the MeNB that an SCG timer was released because of expiration of the inactivity timer, control the MeNB to examine whether to release the radio resource control connection.

In another embodiment of the invention, the apparatus is caused to, in response to recognition that an SCG timer was released because of expiration of the inactivity timer, take the reason for the release of the SCG bearer into account in controlling the MeNB to configure an inactivity timer for the bearer in a subsequent SCG bearer configuration.

In another embodiment of the invention, an apparatus comprises a processor and memory storing a program of instructions. Execution of the program of instructions by the processor causes the apparatus to at least control an SeNB to, in response to receiving an SCG bearer configuration from an MeNB, with the configuration including an inactivity timer, establish the SCG bearer and monitor the timer and, if there is no traffic on the SCG bearer during pendency of the timer, release the SCG bearer.

In another embodiment of the invention, releasing of the SCG bearer by the SeNB comprises sending a bearer release message to the MeNB.

In another embodiment of the invention, the bearer release message sent to the MeNB by the SeNB includes an indication of the reason for the release.

In another embodiment of the invention, if expiration of the inactivity timer was the reason for release of the SCG bearer, the bearer release message sent to the MeNB by the SeNB indicates that the bearer was released due to inactivity.

In another embodiment of the invention, a computer readable medium stores a program of instructions. Execution of the program of instructions by the processor causes the apparatus to at least control an MeNB to configure one or more SCG bearers at an SeNB and signal the configuration to the SeNB, wherein the configuration of an SCG bearer comprises configuring an inactivity timer for the SCG.

In another embodiment of the invention, signaling of the configuration of an SCG bearer to the SeNB comprises signaling the inactivity timer, and wherein, expiration of the inactivity timer for an SCG bearer with no traffic on the SCG bearer with on traffic on the SCG bearer during pendency of the inactivity timer indicates that the SCG bearer can be released.

In another embodiment of the invention, execution of the program of instructions by the processor further configures the apparatus to, in response to recognition by the MeNB that an SCG timer was released because of expiration of the inactivity timer, control the MeNB to examine whether to release the radio resource control connection.

In another embodiment of the invention, execution of the program of instructions by the processor further configures the apparatus to, in response to recognition that an SCG timer was released because of expiration of the inactivity timer, take the reason for the release of the SCG bearer into account in controlling the MeNB to configure an inactivity timer for the bearer in a subsequent SCG bearer configuration.

In another embodiment of the invention, a computer readable medium stores a program of instructions. Execution of the program of instructions by the processor configures an apparatus to at least control an SeNB to, in response to receiving an SCG bearer configuration from an MeNB, with the configuration including an inactivity timer, establish the SCG bearer and monitor the timer and, if there is no traffic on the SCG bearer during pendency of the timer, release the SCG bearer.

In another embodiment of the invention, releasing of the SCG bearer by the SeNB comprises sending a bearer release message to the MeNB.

In another embodiment of the invention, the bearer release message sent to the MeNB by the SeNB includes an indication of the reason for the release.

In another embodiment of the invention, if expiration of the inactivity timer was the reason for release of the SCG bearer, the bearer release message sent to the MeNB by the SeNB indicates that the bearer was released due to inactivity.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here. Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. An apparatus comprising:
   at least one processor;
   memory storing a program of instructions;
   wherein the memory storing the program of instructions is configured to, with the at least one processor, cause the apparatus to at least:
   at a master base station belonging to a wireless communication network comprising the master base station and a secondary cell group comprising at least one secondary base station, configure one or more secondary cell group bearers for a secondary base station, wherein configuring the secondary cell group bearer comprises configuring an inactivity timer for the secondary cell group, and wherein the inactivity timer is configured to indicate that, if no activity has occurred on the secondary cell group bearer during pendency of the inactivity timer, the secondary cell group bearer is to be released; and
   signal the configuration to the secondary base station.

2. The apparatus of claim 1, wherein the apparatus is further caused to, in response to recognition by the master base station that secondary cell group bearer was released because of expiration of the inactivity timer, direct the master base station to examine whether to release the radio resource control connection for the secondary cell group bearer.

3. The apparatus of claim 1, wherein the apparatus is further caused to, upon recognition that the secondary cell group bearer was released because of expiration of the inactivity timer, base configuration of a subsequent activity timer for the activity timer for the bearer on recognition of inactivity as the reason for the release.

4. The apparatus of claim 1, wherein the master base station is a master enhanced node B and the secondary base station is a secondary enhanced node B and wherein an inactivity timer for each secondary cell group bearer is signaled as part of a secondary enhanced node B addition request message.

5. An apparatus comprising:
   at least one processor;
   memory storing a program of instructions;
   wherein the memory storing the program of instructions is configured to, with the at least one processor, cause the apparatus to at least:
   at a secondary base station belonging to a wireless communication network comprising a master base station and a secondary cell group comprising at least the secondary base station, in response to receiving an secondary cell group bearer configuration from a master base station, with the configuration including an inactivity timer, establish the SECONDARY CELL GROUP bearer and monitor the timer;
   in response to expiration of the timer, determine whether traffic has been present during pendency of the inactivity timer; and
   in response to recognition that no traffic has been if there is no traffic on the secondary cell group bearer during pendency of the timer, release the secondary cell group bearer.

6. The apparatus of claim 5, wherein the secondary base station is a secondary enhanced node B and the master base station is a master enhanced node B and wherein releasing of the secondary cell group bearer by the secondary enhanced node B comprises sending a bearer release message to the master enhanced node B.

7. The apparatus of claim 6, wherein the bearer release message includes an indication that the secondary cell group bearer was released due to inactivity.

8. A method comprising:
   at a master base station belonging to a wireless communication network comprising the master base station and a secondary cell group comprising at least one secondary base station, configuring one or more secondary cell group bearers for a secondary base station, wherein configuring the secondary cell group bearer comprises configuring an inactivity timer for the secondary cell group, and wherein the inactivity timer is configured to indicate that, if no activity has occurred on the secondary cell group bearer during pendency of the inactivity timer, the secondary cell group bearer is to be released; and signaling the configuration to the secondary base station.

9. The method of claim 8, further comprising, in response to recognition by the master base station that secondary cell group bearer was released because of expiration of the inactivity timer, direct the master base station to examine whether to release the radio resource control connection for the secondary cell group bearer.

10. The method of claim 8, further comprising, upon recognition that the secondary cell group bearer was released because of expiration of the inactivity timer, base configuration of a subsequent activity timer for the activity timer for the bearer on recognition of inactivity as the reason for the release.

11. The method of claim 8, wherein the master base station is a master enhanced node B and the secondary base station is a secondary enhanced node B and wherein an inactivity timer for each secondary cell group bearer is signaled as part of a secondary enhanced node B addition request message.

12. A method comprising:
   at a secondary base station belonging to a wireless communication network comprising a master base station and a secondary cell group comprising at least the secondary base station, in response to receiving a secondary cell group bearer configuration from a master base station, with the configuration including an inactivity timer, establishing the secondary cell group bearer and monitoring the inactivity timer;
   in response to expiration of the timer, determine whether traffic has been present during pendency of the inactivity timer; and
   in response to recognition that no traffic has been if there is no traffic on the secondary cell group bearer during pendency of the timer, releasing the secondary cell group bearer.

13. The method of claim 12, wherein the secondary base station is a secondary enhanced node B and the master base station is a master enhanced node B and wherein releasing of the secondary cell group bearer by the secondary enhanced node B comprises sending a bearer release message to the master enhanced node B.

14. The method of claim 13, wherein the bearer release message includes an indication that the secondary cell group bearer was released due to inactivity.

15. A non-transitory computer readable memory storing a program of instructions, execution of which by at least one processor configures an apparatus to at least:
   at a master base station belonging to a wireless communication network comprising the master base station and a secondary cell group comprising at least one secondary base station, configure one or more secondary cell group bearers for a secondary base station, wherein configuring the secondary cell group bearer comprises configuring an inactivity timer for the secondary cell group, and wherein the inactivity timer is configured to indicate that, if no activity has occurred on the secondary cell group bearer during pendency of the inactivity timer, the secondary cell group bearer is to be released; and
   signal the configuration to the secondary base station.

16. The non-transitory computer readable memory of claim 15, wherein the apparatus is further configured to, in response to recognition by the master base station that secondary cell group bearer was released because of expiration of the inactivity timer, direct the master base station to examine whether to release the radio resource control connection for the secondary cell group bearer.

17. The non-transitory computer readable memory of claim 15, wherein the apparatus is further configured to, upon recognition that the secondary cell group bearer was released because of expiration of the inactivity timer, base configuration of a subsequent activity timer for the activity timer for the bearer on recognition of inactivity as the reason for the release.

18. The non-transitory computer readable memory of claim 15, wherein the master base station is a master enhanced node B and the secondary base station is a secondary enhanced node B and wherein an inactivity timer for each secondary cell group bearer is signaled as part of a secondary enhanced node B addition request message.

19. A non-transitory computer readable memory storing a program of instructions, execution of which by at least one processor configures an apparatus to at least:
   at a secondary base station belonging to a wireless communication network comprising a master base station and a secondary cell group comprising at least the secondary base station, in response to receiving an secondary cell group bearer configuration from a master base station, with the configuration including an inactivity timer, establish the secondary cell group bearer and monitor the timer;
   in response to expiration of the timer, determine whether traffic has been present during pendency of the inactivity timer; and
   in response to recognition that no traffic has been if there is no traffic on the secondary cell group bearer during pendency of the timer, release the secondary cell group bearer.

20. The non-transitory computer readable memory of claim 19, wherein the secondary base station is a secondary enhanced node B and the master base station is a master enhanced node B and wherein releasing of the secondary cell group bearer by the secondary enhanced node B comprises sending a bearer release message to the master enhanced node B.

* * * * *